United States Patent [19]

Watson et al.

[11] 4,050,771
[45] Sept. 27, 1977

[54] THREADED TERMINAL ASSEMBLY FOR DYNAMOELECTRIC MACHINE

[75] Inventors: Richard D. Watson, Chesterfield; Thomas R. Sowash, Anderson, both of Ind.

[73] Assignee: General Motors Corporation, Detroit, Mich.

[21] Appl. No.: 701,639

[22] Filed: July 1, 1976

[51] Int. Cl.$^2$ ............................................. H01R 7/08
[52] U.S. Cl. .......................... 339/263 R; 151/41.75; 403/408
[58] Field of Search .................. 339/263; 151/41.75, 151/69; 403/408

[56] References Cited

U.S. PATENT DOCUMENTS 3,727,660   4/1973   Burge ..................................... 151/69

FOREIGN PATENT DOCUMENTS 1,494,306   7/1967   France ............................ 151/41.75
2,263,411   10/1975   France ............................ 339/263 R Primary Examiner—Joseph H. McGlynn
Attorney, Agent, or Firm—Warren D. Hill

[57] ABSTRACT

An automotive alternator end frame includes a slotted portion to which a threaded terminal is to be attached. A square shanked bolt is inserted into an insulating grommet comprising spaced washer members supported by a central sleeve of square cross section. The bolt and grommet are assembled to the frame from the outside thereof by sliding the grommet into the slot with the washers overlying the opposed surfaces of the housing. One of the washers is connected to the sleeve through a thin web member so that when a nut is tightened onto the bolt, the web deforms or fractures so that the washer spacing can conform to the frame thickness.

2 Claims, 6 Drawing Figures

THREADED TERMINAL ASSEMBLY FOR DYNAMOELECTRIC MACHINE

This invention relates to electrical terminals for dynamoelectric machines.

Presently it is well known to provide a threaded terminal assembly on a dynamoelectric machine such as an alternator by assembling an insulating washer with an integral sleeve portion to the bolt and inserting that assembly through a hole in the frame, then applying an insulating washer and a nut to the other end of the bolt along with any other desired electrical connectors to secure the assembly. That arrangement results in the threaded terminal secured to and insulated from the housing but it requires access to both sides of the housing to accomplish the assembly. A further disadvantage is that two insulating parts are required. It is desirable, however, to be able to assemble the primary mechanical components of the machine and test the assembly before the terminal or other electrical components are secured to the frame and then assemble the terminal to the frame after the testing. This, however, requires the terminal to be secured to the frame without access to the machine interior.

It is therefore an object of the invention to provide a threaded terminal assembly for a dynamoelectric machine which requires access to only the outside of the machine frame during assembly.

Another object of the invention is to provide such a terminal assembly with a single unitary insulating grommet to minimize the number of parts required during assembly.

The invention is carried out by providing an insulating grommet having a pair of spaced washers integrally connected with a sleeve member having a square cross section both internally and externally. The grommet is mounted over a square shanked bolt and the assembly is slidingly mounted into a slot in the motor frame. One of the washers of the grommet is connected to the sleeve by a thin deformable or frangible web so that when axial force is applied to the grommet, the washer spacing can change to conform to the housing thickness.

The above and other advantages will be made more apparent from the following specification taken in conjunction with the accompanying drawings wherein like reference numerals refer to like parts and wherein.

Figure 1:
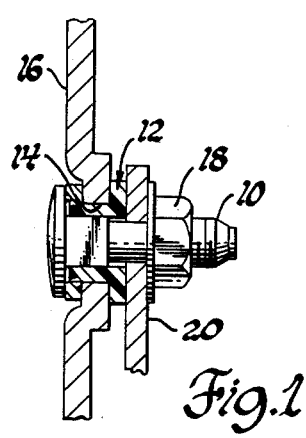
FIG. 1 is a cross-sectional elevation of a terminal assembly according to the invention.
Figure 2:
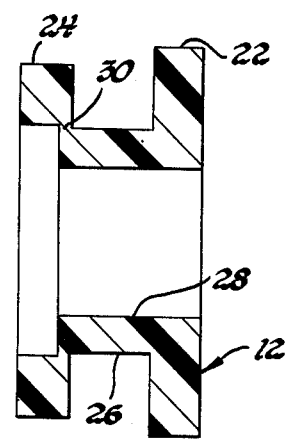
FIG. 2 is a cross-sectional view of a grommet of the assembly of FIG. 1.
Figure 3:
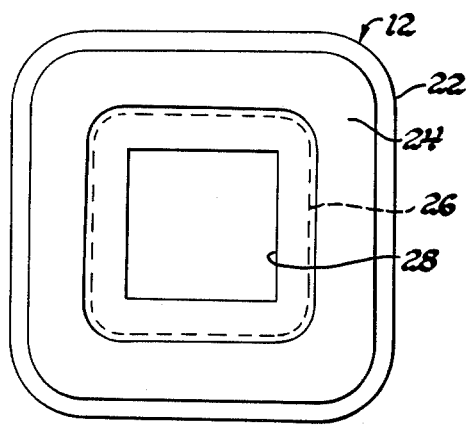
FIG. 3 is a side view of the grommet of FIG. 2.
Figure 4:
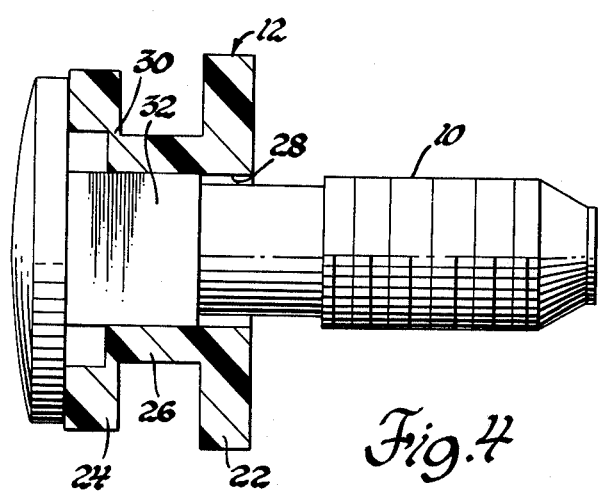
FIG. 4 is a subassembly of a bolt with a grommet prior to the assembly to the dynamoelectric machine.

Referring to FIG. 1, a threaded termal assembly comprises a bolt 10 having an insulating grommet 12 surrounding its shank portion and inserted within an aperture 14 of a machine frame 16. A nut 18 threaded onto the bolt 10 secures the bolt and grommet assembly to the frame and capture between the nut and the grommet the terminal 20 of an electrical component. As shown in FIGS. 2 and 3, the grommet 12 includes a pair of spaced washers 22 and 24 each integrally connected to a sleeve 26. The spacing between the washers is slightly greater than the thickness of the frame to allow easy assembly. The inner surface 28 of the sleeve 26 defines a square opening while the outer surface of the sleeve is essentially square except for rounded corners. The inner diameter of the washer 24 is the same dimension as or slightly larger than the outer dimension of the sleeve 26. The washer 24 is secured to the sleeve 26 through a thin integral web 30. The web 30 is so formed that when axial force is applied across the grommet during assembly, the web will deform or fracture as seen in FIG. 1, allowing the washer 24 to move closer to the washer 22 to tightly grip the opposed surfaces of the frame 16 thereby allowing a tolerance of the cast frame member thickness. The grommet is molded of glass reinforced thermoplastic polyester material. FIG. 4 shows the subassembly of the bolt 10 and the grommet 12. The square shank 32 is dimensioned such that some force is required to assemble the grommet to the bolt thereby providing an interference fit assuring that the assembly will remain intact. The washer 24 is positioned adjacent the bolt head so that it is retained in place even after it has sheared from the sleeve of the grommet. The assembly then will remain firmly in place in the slot of the motor frame after having been once securely assembled thereto even if the nut is thereafter removed.

Figure 5:
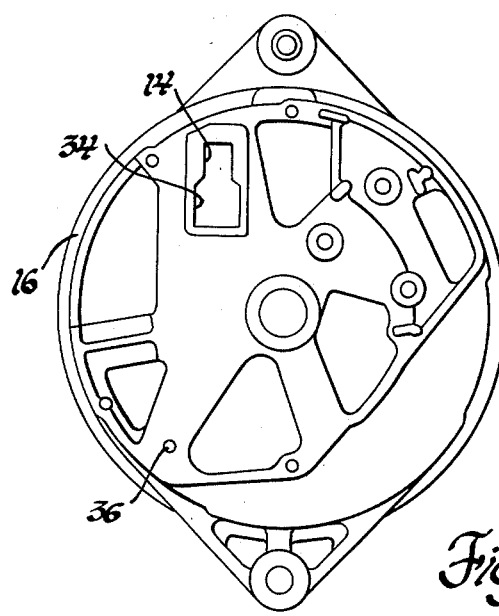
FIG. 5 is an end view of a machine frame prior to being fitted with the threaded terminal assembly of FIG. 1.

FIG. 5 shows the last metal end frame having the slotted aperture 14 which is connected at one end to an enlarged aperture 34 which is sufficiently large to allow the head of the bolt 10 and the washer 24 of the grommet to pass through. Thus the bolt and grommet assembly can be slidably inserted into the slot 14 whereby the assembly is readily accomplished from the outside without access to the inside of the frame 16. The frame also includes an aperture 36 spaced from the slot 14.

Figure 6:
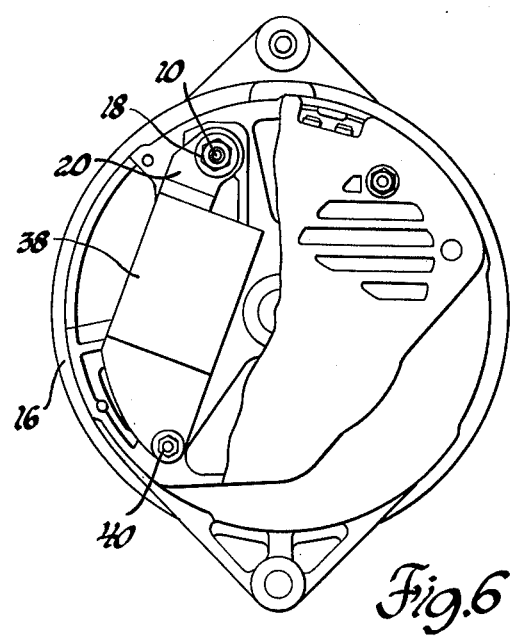
FIG. 6 is a view of the machine frame after assembly of the terminal according to the invention.

FIG. 6 shows the frame 16 with an electrical component 38 such as a rectifier bridge having one end secured to the motor frame by a fastener 40 extending through the aperture 36 and the other end comprising the terminal 20 secured to the bolt 10 and is held onto the bolt 10 by nut 18 as also shown in FIG. 1. The component 38 by virtue of being anchored by the fastener 40 prevents lateral movement of the terminal assembly in the slot 14.

It is readily seen then that a terminal assembly utilizing a one piece insulating grommet according to the invention is easily assembled to a dynamoelectric machine frame having access to one side only, and is securely fastened to the frame.

The embodiments of the invention in which an exclusive property or privilege is claimed are defined as follows:

1. A threaded terminal assembly for a dynamoelectric machine having a slotted frame member,
    a unitary insulating grommet member having a pair of washer portions spaced by a distance greater than the thickness of the frame member and connected by a central sleeve portion of square cross section for a sliding non-rotatable fit into the slotted frame member with the washer portions loosely overlying opposed surfaces of the frame member, one of the washer portions being connected to the sleeve through a yieldable web member so that upon application of axial force to the grommet during assembly the web member will yield to conform the washer spacing to the frame thickness,
    a square shanked bolt held securely within the grommet by an interference fit between the bolt shank and the interior of the sleeve portion whereby the bolt is non-rotatably mounted to the frame member and insulated therefrom and is at least temporarily held firmly in such mounted position prior to attachment of a nut to the bolt for complete assembly.

2. A threaded terminal assembly for a dynamoelectric machine, the machine having a frame member, a keyhole shaped aperture in the frame member comprising a slot portion and a contiguous enlarged portion, and a second aperture spaced therefrom for receiving a fastener, a unitary insulating grommet member having a pair of washer portions spaced by a distance greater than the thickness of the frame member and connected by a central sleeve portion of square cross section for a sliding non-rotatable fit into the slot portion with the washer portions loosely overlying opposed surfaces of the frame member, one of the washer portions being connected to the sleeve through a yieldable web member so that upon application of axial force to the grommet during assembly the web member will yield to conform the washer spacing to the frame thickness, a bolt having a square shank held securely within the central sleeve portion of the grommet and a head bearing against one of the washer portions, the bolt head and adjacent washer portion being dimensioned to fit through the enlarged portion of the aperture in the frame for sliding into the slot portion, and means secured to the frame member by a fastener in the second aperture and secured to the bolt to prevent sliding movement of the bolt and grommet in the slot portion after assembly, whereby the bolt is non-rotatably mounted to the frame member and insulated therefrom to comprise a threaded terminal.

* * * * *